United States Patent
Kohama

(10) Patent No.: US 10,300,884 B2
(45) Date of Patent: May 28, 2019

(54) PRETENSIONER AND SEAT BELT DEVICE

(71) Applicant: JOYSON SAFETY SYSTEMS JAPAN K.K., Tokyo (JP)

(72) Inventor: Shigeru Kohama, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 32 days.

(21) Appl. No.: 15/639,715

(22) Filed: Jun. 30, 2017

(65) Prior Publication Data

US 2018/0001868 A1    Jan. 4, 2018

(30) Foreign Application Priority Data

Jul. 4, 2016 (JP) ................. 2016-132255

(51) Int. Cl.
*B60R 22/46* (2006.01)

(52) U.S. Cl.
CPC ...... *B60R 22/4633* (2013.01); *B60R 22/4619* (2013.01)

(58) Field of Classification Search
CPC .............. B60R 22/4633; B60R 22/4619
USPC .................................. 297/470, 480
See application file for complete search history.

(56) References Cited

U.S. PATENT DOCUMENTS

| | | | | |
|---|---|---|---|---|
| 6,039,353 A * | 3/2000 | Bauer | ............ | B60R 22/1952 188/374 |
| 7,878,548 B2 * | 2/2011 | Kohama | ............ | B60R 22/1952 280/806 |
| 8,132,829 B2 * | 3/2012 | Sugiyama | ............ | B60R 22/1955 280/806 |
| 9,834,174 B2 * | 12/2017 | Kacprzak | ............ | B60R 22/1952 |

FOREIGN PATENT DOCUMENTS

JP   2009-173103 A   8/2009

* cited by examiner

*Primary Examiner* — Faye M Fleming
(74) *Attorney, Agent, or Firm* — Foley & Lardner LLP

(57) ABSTRACT

A pretensioner and a seat belt device are provided. A pretensioner includes a wire connected to webbing that restrains an occupant, a piston disposed to the wire, a cylinder that slidably accommodates the piston, a gas generator that applies driving force to the piston, and a housing that integrally connects the cylinder and the gas generator. The housing includes an insertion hole that guides the wire, a communication part that is communicated with the cylinder and the insertion hole, and a gas-supply port that supplies gas generated by the gas generator to the communication part. The pretensioner includes a wire guide disposed at a boundary portion of the insertion hole and the communication part, and a holding member that is inserted into the communication part and locked to the gas-supply port, thereby to position the wire guide.

6 Claims, 5 Drawing Sheets

PRETENSIONER AND SEAT BELT DEVICE

CROSS-REFERENCE TO RELATED APPLICATION

This application is based upon and claims benefit of priority from the Japanese Patent Application No. 2016-132255, filed on Jul. 4, 2016, the entire contents of which are incorporated herein by reference.

TECHNICAL FIELD

The present invention relates to a pretensioner and a seat belt device, and in particular, relates to a pretensioner suitable for a lap belt, and a seat belt device that includes the pretensioner.

BACKGROUND ART

Vehicles, such as automobiles, are generally mounted with seat belt devices that restrain an occupant in a seat that includes a seat portion on which the occupant sits and a backrest portion positioned back of the occupant. Such a seat belt device has webbing that restrains the occupant, a retractor that winds the webbing, a guide anchor that is provided on a vehicle body side and guides the webbing, a belt anchor that fixes the webbing to the vehicle body side, a buckle disposed on a side surface of the seat, and a tongue disposed to the webbing. The tongue is fitted into the buckle, thereby to restrain the occupant in the seat with the webbing.

The webbing in restraining the occupant can be classified into a lap belt that restrains the occupant's waist with the webbing between the belt anchor and the tongue, and a shoulder belt that obliquely restrains the occupant's shoulder with the webbing between the guide anchor and the tongue.

In such a seat belt device, it has been already proposed to arrange a pretensioner capable of retracting the lap belt of the webbing in the belt anchor, in order to improve performance of restraining the occupant in a vehicle collision.

Such a pretensioner includes, for example, as described in Japanese Unexamined Patent Application Laid-open No. 2009-173103, a wire connected to the lap belt, a piston disposed at an end of the wire, a cylinder that slidably accommodates the piston, a gas generator that applies driving force to the piston, and a housing that communicatively connects the cylinder and the gas generator. Additionally, the wire inserted into the housing is inserted into a protection-seal body, which is integrally formed by a protection member and a seal member, and the protection-seal body is fixed inside the housing by a retaining ring.

SUMMARY OF INVENTION

The invention described in Japanese Unexamined Patent Application Laid-open No. 2009-173103 has a problem that manufacturing cost becomes high since the retaining ring is a metal part, and the protection-seal body is a resin part.

The present invention has been made in view of the above-described problem, and an object of the present invention is to provide a pretensioner and a seat belt device that can achieve cost reduction.

According to the present invention, there is provided a pretensioner including a wire connected to webbing that restrains an occupant, a piston disposed to the wire, a cylinder that slidably accommodates the piston, a gas generator that applies driving force to the piston, and a housing that integrally connects the cylinder and the gas generator, in which the housing includes an insertion hole that guides the wire, a communication part that is communicated with the cylinder and the insertion hole, and a gas-supply port that supplies gas generated by the gas generator to the communication part, and the pretensioner includes a wire guide disposed at a boundary portion of the insertion hole and the communication part, and a holding member that is inserted into the communication part and locked to the gas-supply port, thereby to position the wire guide.

Additionally, according to the present invention, there is provided a seat belt device including webbing that restrains an occupant, and a belt anchor that fixes the webbing to a vehicle body side, in which the belt anchor is provided with a pretensioner including a wire connected to the webbing, a piston disposed to the wire, a cylinder that slidably accommodates the piston, a gas generator that applies driving force to the piston, and a housing that integrally connects the cylinder and the gas generator, the housing includes an insertion hole that guides the wire, a communication part that is communicated with the cylinder and the insertion hole, and a gas-supply port that supplies gas generated by the gas generator to the communication part, and the pretensioner includes a wire guide disposed at a boundary portion of the insertion hole and the communication part, and a holding member that is inserted into the communication part and locked to the gas-supply port, thereby to position the wire guide.

In the pretensioner and the seat belt device described above, the holding member may also include a main body that is made of resin and in a cylindrical shape, and a projection lockable to the gas-supply port. Further, the holding member may also include a rib formed axially on a surface of the main body.

Moreover, the housing may include a key groove formed axially on the holding member, and the holding member may have a protrusion that can be inserted into the key groove.

Moreover, the housing may include a key groove formed axially on the holding member, and the holding member may include a main body that is made of resin and in a cylindrical shape, a protrusion that is formed on the main body and can be inserted into the key groove, a projection that is formed on the protrusion and lockable to the gas-supply port, and a rib formed axially on a surface of the main body.

According to the pretensioner and the seat belt device of the present invention described above, since the holding member is made to be locked to the gas-supply port formed in the housing, the holding member can be easily disposed in the housing, and product cost can be reduced, even when a material of the holding member is changed from metal to resin.

BRIEF DESCRIPTION OF DRAWINGS

FIGS. 2(A) and 2(B) are enlarged views illustrating a housing shown in FIG. 1, in which FIG. 2(A) illustrates a cross-sectional view, and FIG. 2(B) illustrates a front view.

FIGS. 3(A) and 3(B) are enlarged views illustrating a holding member shown in FIG. 1, in which FIG. 3(A) illustrates a side view, and FIG. 3(B) illustrates a front view.

FIGS. 4(A) and 4(B) are views illustrating modifications of the holding member, in which FIG. 4(A) illustrates a first modification, and FIG. 4(B) illustrates a second modification.

DETAILED DESCRIPTION OF THE PREFERRED EMBODIMENTS

Figure 1:
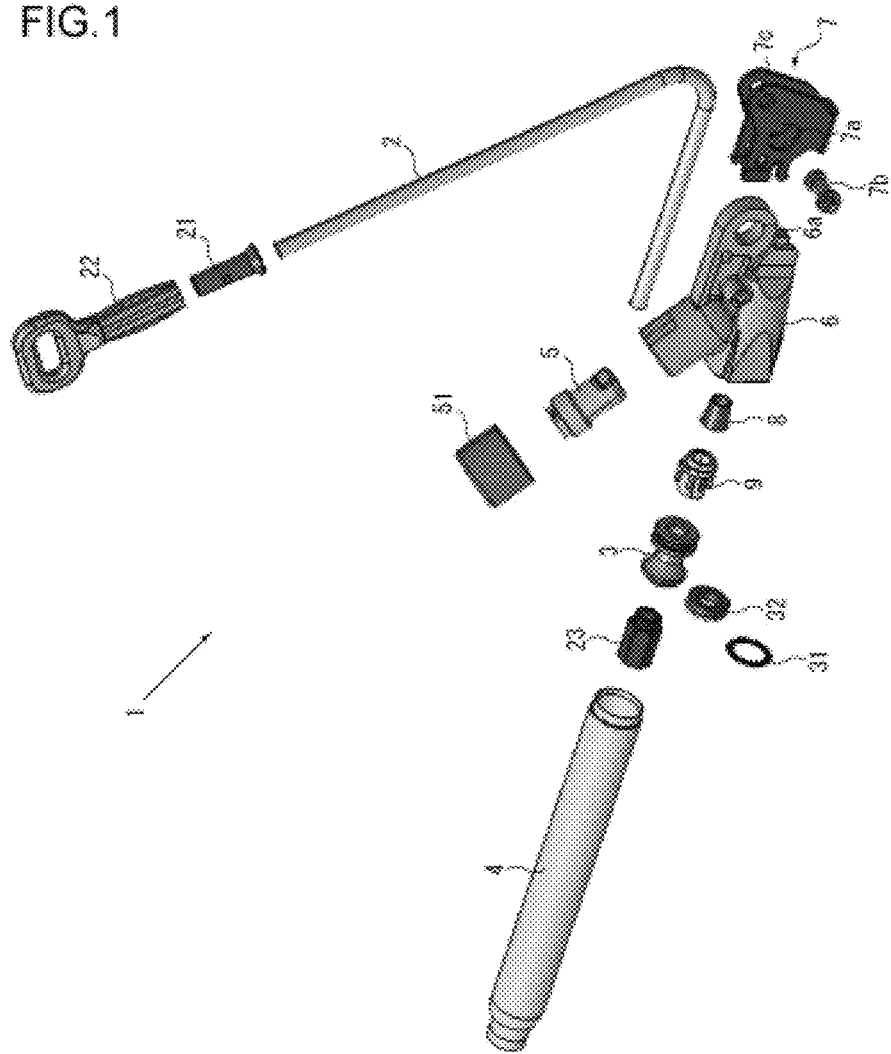
FIG. 1 is a developed view of parts, showing a pretensioner according to an embodiment of the present invention.
Figure 2A:
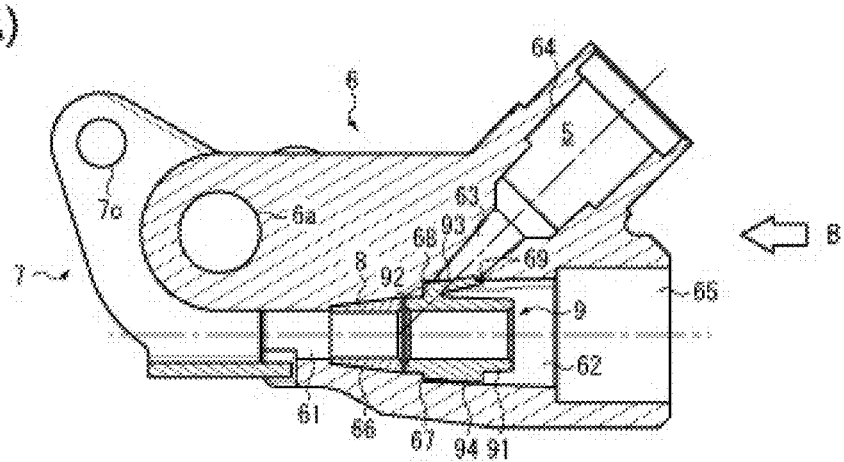
Figure 2B:
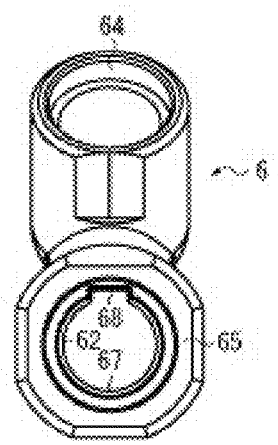
Figure 3A:
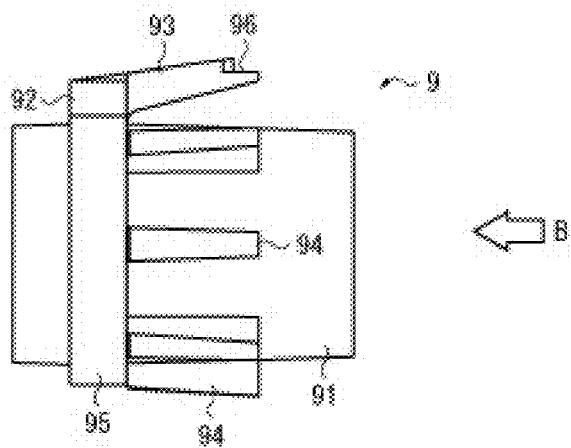
Figure 3B:
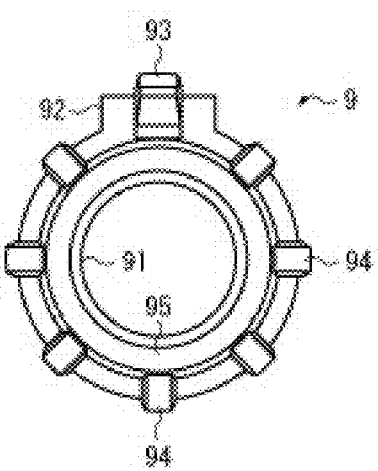

An embodiment of the present invention is now described below with reference to FIGS. 1 to 5. Here, FIG. 1 is a developed view of parts, showing a pretensioner according to an embodiment of the present invention. FIGS. 2(A) and 2(B) are enlarged views illustrating a housing shown in FIG. 1, in which FIG. 2(A) illustrates a cross-sectional view, and FIG. 2(B) illustrates a front view. FIGS. 3(A) and 3(B) are enlarged views illustrating a holding member shown in FIG. 1, in which FIG. 3(A) illustrates a side view, and FIG. 3(B) illustrates a front view.

A pretensioner 1 according to an embodiment of the present invention includes, for example, as shown in FIGS. 1 to 3(B), a wire 2 connected to webbing that restrains an occupant, a piston 3 disposed to the wire 2, a cylinder 4 that slidably accommodates the piston 3, a gas generator 5 that applies driving force to the piston 3, a housing 6 that integrally connects the cylinder 4 and the gas generator 5, and a bracket 7 that is connected to the housing 6 and positions wire 2. The housing 6 includes an insertion hole 61 that guides the wire 2, a communication part 62 that is communicated with the cylinder 4 and the insertion hole 61, and a gas-supply port 63 that supplies gas generated by the gas generator 5 to the communication part 62. The pretensioner 1 includes a wire guide 8 disposed at a boundary portion 66 of the insertion hole 61 and the communication part 62, and a holding member 9 that is inserted into the communication part 62 and locked to the gas-supply port 63, thereby to position the wire guide 8.

The pretensioner 1 has a function as a belt anchor, and is fixed to a vehicle body by inserting a bolt into a securing hole 7a formed on the bracket 7, and a securing hole 6a formed on the housing 6. The bracket 7 includes an opening 7c for securing a rivet 7b, and a bending angle of the wire 2 is maintained by securing the rivet 7b to the bracket 7.

A first end of the wire 2 is connected with a holder 21, and the holder 21 is connected to a ferrule 22. The ferrule 22 is connected to an end of the webbing. The webbing connected with the wire 2 via the ferrule 22 forms a lap belt that restrains occupant's waist in restraining the occupant.

A second end of the wire 2 is inserted into the housing 6 via the bracket 7, and connected to a wire end 23 in the cylinder 4. The piston 3 is slidably arranged in the cylinder 4, and the wire 2 is inserted into the piston 3 and then connected to the wire end 23. An outer circumference of the piston 3 is disposed with an O-ring 31 that improves airtightness. An intermediate portion of the piston 3 is disposed with a ball and a ball ring 32 for preventing reversing.

The gas generator 5 is, as illustrated in FIG. 2(A), disposed in an opening (gas-generator mounting portion 64) formed in the housing 6, and fixed to the housing 6 by a keeper 51. A passage connecting this gas-generator mounting portion 64 with the communication part 62 forms the gas-supply port 63.

Moreover, the gas generator 5 is, for example, connected to an acceleration sensor that detects a vehicle collision, and the gas generator 5 operates upon a vehicle collision to inject high pressure gas into the housing 6. The high pressure gas injected into the housing 6 presses the piston 3, and moves the piston 3 in a direction away from the housing 6. Along with the movement of the piston 3, the wire 2 is retracted in the housing 6 and the cylinder 4, and fastens the webbing (lap belt).

The housing 6 is, for example, formed of a material with a lower specific gravity than iron (e.g., aluminum, aluminum alloy, or the like). In particular, the housing 6 may be manufactured by aluminum die cast. Adopting a material with a lower specific gravity than iron enables weight reduction of the housing 6.

Additionally, the housing 6 has, as shown in FIG. 2(A), an insertion hole 61 that guides the wire 2 from the bracket 7 to the cylinder 4, on a first-end side, and has a connecting part 65 connected with the cylinder 4, on a second-end side. The insertion hole 61 is inserted with the wire 2, and the connecting part 65 is screwed with a screw portion of the cylinder 4. Between the insertion hole 61 and the connecting part 65, there is formed the communication part 62 that is communicated with the insertion hole 61 and the connecting part 65.

An inner circumferential surface of the communication part 62 on a side of the insertion hole 61 forms a conical surface reduced in diameter toward the insertion hole 61, and forms the boundary portion 66 of the insertion hole 61 and the communication part 62. The boundary portion 66 is inserted with the wire guide 8 made of resin. The wire guide 8 has a substantially truncated cone shape, and has a hole that can be inserted with the wire 2 in a center. The wire guide 8 guides the wire 2 to the communication part 62, and has a function of sealing the boundary portion 66.

Additionally, the communication part 62 may have a stepped portion 67 that regulates an axial position of the holding member 9 when the holding member 9 is inserted, and may have a key groove 68 that regulates rotation (circumferential position) of the holding member 9. The key groove 68 is, for example, as shown in FIG. 2(B), formed by cutting a part of the inner circumferential surface of the communication part 62. It should be noted the front view illustrated in FIG. 2(B) is equivalent to a view as viewed from the direction of the arrow B in FIG. 2(A). Moreover, for convenience of description, a drawing of the gas generator 5 and the holding member 9 is omitted in FIG. 2(B).

Further, the inner circumferential surface of the communication part 62 may be formed such that a diameter is slightly reduced toward the boundary portion 66 from the connecting part 65, in order to improve holding performance of the holding member 9. As shown in FIG. 2(A), on a part of the inner circumferential surface of the communication part 62, an opening communicated with the gas-supply port 63 is formed. Consequently, a branch portion 69 is formed between the communication part 62 and the gas-supply port 63.

The holding member 9 includes, for example, as shown in FIGS. 3(A) and 3(B), a main body 91 that is made of resin and in a cylindrical shape, a protrusion 92 that is formed on the main body 91 and can be inserted into the key groove 68, a projection 93 that is formed on the protrusion 92 and lockable to the gas-supply port 63, and a plurality of ribs 94 formed axially on a surface of the main body 91. It should be noted the front view illustrated in FIG. 3(B) is equivalent to a view as viewed from the direction of the arrow B in FIG. 3(A).

The holding member 9 is a resin part, and the main body 91, the protrusion 92, the projection 93, and the ribs 94 are integrally formed by injection molding or the like. The main body 91 may have, on a part of an outer circumference, a diameter-expanded portion 95 that abuts against the stepped portion 67 of the communication part 62. The protrusion 92 is formed such that a part of the diameter-expanded portion 95 projects radially outward, and the protrusion 92 has a shape that can be inserted into the key groove 68 of the communication part 62 formed axially.

The projection 93 has a lever shape that is formed so as to axially project from the protrusion 92. The projection 93 is formed such that a tip portion is slightly separated from the outer circumference of the main body 91 with respect to a root portion, and the projection 93 is structured to be flexible radially of the main body 91. Additionally, the tip of the projection 93 may be formed with a locking portion 96 lockable to the branch portion 69 of the housing 6. The locking portion 96 is, for example, a stepped portion formed at the tip of the projection 93.

The ribs 94 are formed along an axial direction as shown in FIG. 3(A), and the seven ribs 94 are uniformly arranged at an interval of 22.5° with respect to the projection 93 as a reference, as shown in FIG. 3(B). The ribs 94 have a function of preventing an axial center of the main body 91 from moving away due to deviation or inclination when the holding member 9 is inserted into the communication part 62, and the projection 93 is locked to the gas-supply port 63 (branch portion 69 in this embodiment). Therefore, the ribs 94 are, for example, preferably arranged at a position to regulate a movement in a direction opposite to the projection 93 (vertical direction) and a horizontal direction.

The number and arrangement of the ribs 94 are, however, not limited to the illustrated arrangement. For example, the ribs 94 may be arranged at two positions of a range between 45° to 90° and a range between 90° to 135°, and there may be arranged a rib 94 formed with a wider width than the illustrated ribs 94. Further, depending on a shape of the communication part 62 formed in the housing 6, the ribs 94 may be omitted.

After the wire guide 8 is inserted into the boundary portion 66 from the communication part 62 of the housing 6, for example, as shown in FIG. 2(B), the above-described holding member 9 is inserted and pushed into the communication part 62, with the protrusion 92 positioned to the key groove 68. At this time, the projection 93 is pressed in while abutting and being bent on an inner surface of the communication part 62. Then, when the diameter-expanded portion 95 of the holding member 9 abuts against the stepped portion 67 of the communication part 62, and the projection 93 reaches the gas-supply port 63, the locking portion 96 of the projection 93 is locked to the branch portion 69 of the housing 6.

Thus, simply pushing the holding member 9 into the communication part 62 allows the holding member 9 to be locked to the housing 6, enabling easy positioning of the wire guide 8. It should be noted that, the wire guide 8 and the holding member 9 are preferably inserted into the communication part 62, with the wire 2 inserted into the wire guide 8 and the holding member 9.

Since the holding member 9 is a resin part, the holding member 9 can be crushed by high pressure gas generated from the gas generator 5 upon operation of the pretensioner 1, and the crushed holding member 9 is contained in the communication part 62. Therefore, until the pretensioner 1 operates, the wire guide 8 can be easily positioned.

According to the pretensioner 1 of the embodiment described above, since the holding member 9 is made to be locked to the gas-supply port 63 formed in the housing 6, the holding member 9 can be easily disposed in the housing 6, and cost for the pretensioner 1 can be reduced, even when a material of the holding member 9 is changed from metal to resin.

Figure 4A:
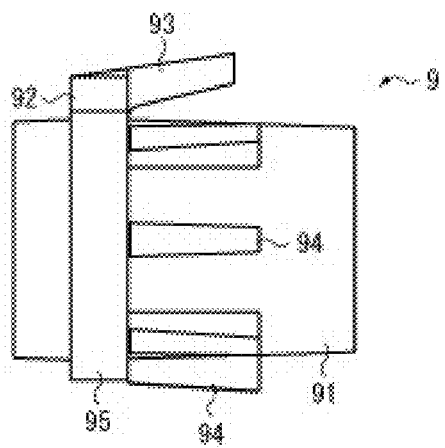
Figure 4B:
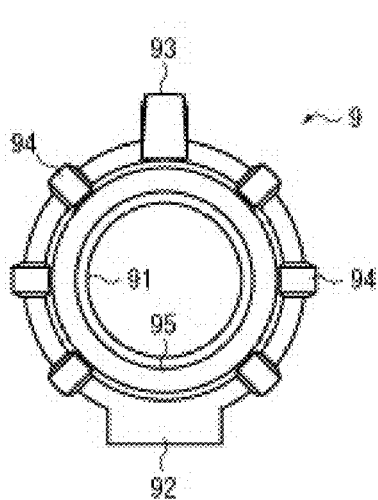

Here, FIGS. 4(A) and 4(B) are views illustrating modifications of the holding member, in which FIG. 4(A) illustrates a first modification, and FIG. 4(B) illustrates a second modification. It should be noted that like reference numerals are given to components that are identical to those of the holding member 9 illustrated in FIGS. 3(A) and 3(B), to omit a repeated description.

The first modification illustrated in FIG. 4(A) is made by omitting the locking portion 96 formed at the tip of the projection 93. Such a configuration also allows the tip of the projection 93 to be locked to the gas-supply port 63, and the wire guide 8 to be positioned.

The second modification illustrated in FIG. 4(B) is made by forming the protrusion 92 and the projection 93 at different positions. In the illustrated second modification, the protrusion 92 is arranged at a position opposite to the projection 93. In such a modification, the key groove 68 is also formed at a position opposite to the gas-supply port 63 in the communication part 62 of the housing 6. In such a way, the protrusion 92 and the key groove 68 can be formed at any positions, and the projection 93 may be formed at a position different from that of the protrusion 92.

Figure 5:
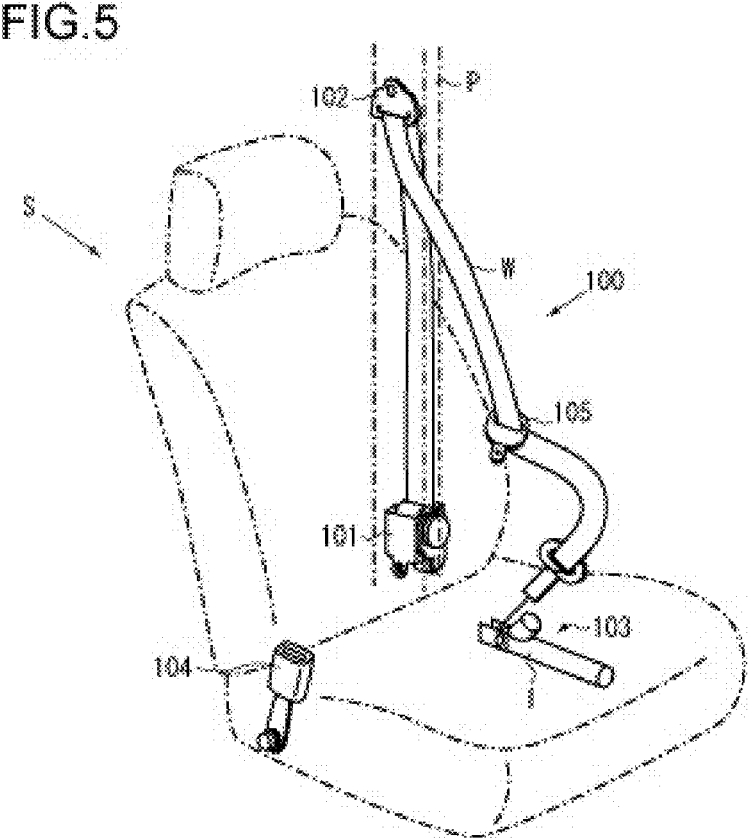
FIG. 5 is a view illustrating an overall structure of a seat belt device according to an embodiment of the present invention.

Next, a seat belt device according to an embodiment of the present invention is described with reference to FIG. 5. Here, FIG. 5 is a view illustrating an overall structure of the seat belt device according to an embodiment of the present invention. It should be noted that, for convenience of description, parts other than the seat belt device are indicated by dotted-chain lines in FIG. 5.

A seat belt device 100 according to the embodiment illustrated in FIG. 5 includes webbing W that restrains an occupant, a retractor 101 that winds the webbing W, a guide anchor 102 that is provided on a vehicle body side and guides the webbing W, a belt anchor 103 that fixes the webbing W to the vehicle body side, a buckle 104 that is disposed on a side surface of a seat S on which the occupant sits, and a tongue 105 that is disposed to the webbing W. The belt anchor 103 includes, for example, a pretensioner 1 illustrated in FIG. 1.

The seat belt device 100 illustrated in FIG. 5 is a seat belt device disposed at a passenger seat. A first end of the webbing W is connected to the retractor 101, and a second end of the webbing W is connected to the belt anchor 103. An intermediate portion of the webbing W is inserted into the belt anchor 103 and the tongue 105. Fitting the tongue 105 into the buckle 104 enables restraint of the occupant sitting on the seat S by the webbing W.

In restraining the occupant, the webbing W can be classified into a lap belt that restrains the occupant's waist with the webbing W between the belt anchor 103 and the tongue 105, and a shoulder belt that restrains the occupant's shoulder with the webbing W between the guide anchor 102 and the tongue 105.

The belt anchor 103 is configured by the pretensioner 1 illustrated in FIG. 1. In particular, the pretensioner 1 is fixed to a vehicle body by inserting a bolt into a securing hole 7a of the bracket 7 and a securing hole 6a of the housing 6, and securing the bolt to the vehicle body side. Thus, performance of restraining an occupant in a vehicle collision can be improved by disposing the pretensioner 1 to the belt anchor 103.

Thus, by using the pretensioner 1 according to the embodiment (including modifications) described above, since the holding member 9 is made to be locked to the gas-supply port 63 formed in the housing 6, the holding member 9 can be easily disposed in the housing 6, and cost for the seat belt device 100 can be reduced, even when a material of the holding member 9 is changed from metal to resin.

The present invention is not limited to the above-described embodiment. Of course, the present invention can be changed in various manners without departing from the gist of the invention. For example, the seat belt device 100 may be a seat belt device used for a driver's seat or a rear seat of a vehicle, and may be a seat belt device used for a conveyance other than the vehicle.

What is claimed is:

1. A pretensioner comprising:
a wire connected to webbing that restrains an occupant;
a piston disposed to the wire;
a cylinder that slidably accommodates the piston;
a gas generator that applies driving force to the piston; and
a housing that integrally connects the cylinder and the gas generator, wherein
the housing comprises an insertion hole that guides the wire, a communication part that is communicated with the cylinder and the insertion hole, and a gas-supply port that supplies gas generated by the gas generator to the communication part, and
the pretensioner includes a wire guide disposed at a boundary portion of the insertion hole and the communication part, and a holding member that is inserted into the communication part and locked to the gas-supply port, thereby to position the wire guide,
wherein the holding member comprises a main body that is made of resin and in a cylindrical shape, a projection lockable to the gas-supply port, and a rib formed axially on a surface of the main body.

2. A seat belt device comprising: webbing that restrains an occupant; and a belt anchor that fixes the webbing to a vehicle body side, wherein
the belt anchor comprises a pretensioner according to claim 1.

3. A pretensioner comprising:
a wire connected to webbing that restrains an occupant;
a piston disposed to the wire;
a cylinder that slidably accommodates the piston;
a gas generator that applies driving force to the piston; and
a housing that integrally connects the cylinder and the gas generator, wherein
the housing comprises an insertion hole that guides the wire, a communication part that is communicated with the cylinder and the insertion hole, and a gas-supply port that supplies gas generated by the gas generator to the communication part, and
the pretensioner includes a wire guide disposed at a boundary portion of the insertion hole and the communication part, and a holding member that is inserted into the communication part and locked to the gas-supply port, thereby to position the wire guide,
wherein the housing comprises a key groove formed axially on the holding member, and the holding member has a protrusion that can be inserted into the key groove.

4. A seat belt device comprising: webbing that restrains an occupant; and a belt anchor that fixes the webbing to a vehicle body side, wherein
the belt anchor comprises a pretensioner according to claim 3.

5. A pretensioner comprising:
a wire connected to webbing that restrains an occupant;
a piston disposed to the wire;
a cylinder that slidably accommodates the piston;
a gas generator that applies driving force to the piston; and
a housing that integrally connects the cylinder and the gas generator, wherein
the housing comprises an insertion hole that guides the wire, a communication part that is communicated with the cylinder and the insertion hole, and a gas-supply port that supplies gas generated by the gas generator to the communication part, and
the pretensioner includes a wire guide disposed at a boundary portion of the insertion hole and the communication part, and a holding member that is inserted into the communication part and locked to the gas-supply port, thereby to position the wire guide,
wherein the housing comprises a key groove formed axially on the holding member, and the holding member comprises a main body that is made of resin and in a cylindrical shape, a protrusion that is formed on the main body and can be inserted into the key groove, a projection that is formed on the protrusion and lockable to the gas-supply port, and a rib formed axially on a surface of the main body.

6. A seat belt device comprising: webbing that restrains an occupant; and a belt anchor that fixes the webbing to a vehicle body side, wherein
the belt anchor comprises a pretensioner according to claim 5.

* * * * *